Dec. 25, 1923.
D. C. P. SHELBY
1,478,537
EXTENSION SLEIGH BOLSTER
Filed Dec. 28, 1921    2 Sheets-Sheet 1
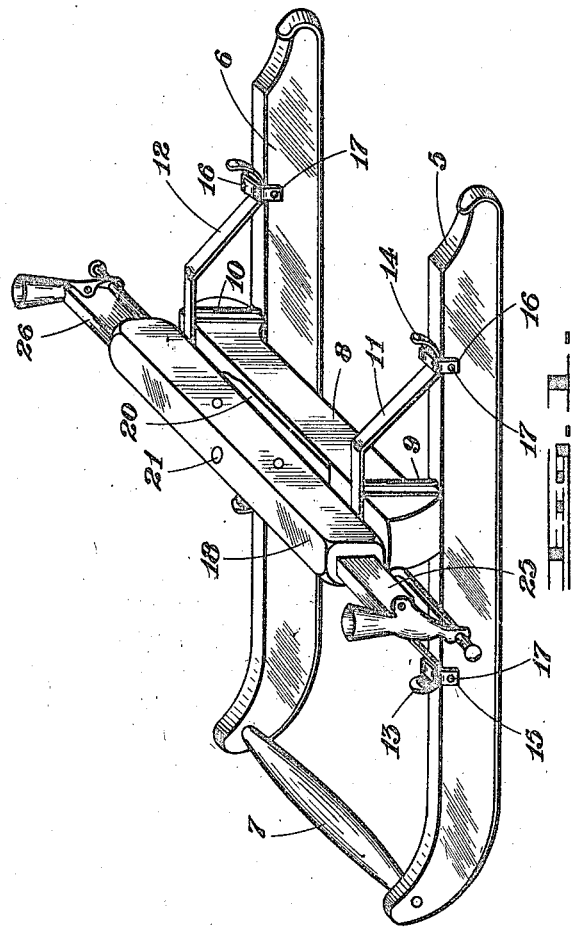
INVENTOR
DAVID C. P. SHELBY.
BY
ATTORNEY Dec. 25, 1923.                                              1,478,537
                     D. C. P. SHELBY
                 EXTENSION SLEIGH BOLSTER
                  Filed Dec. 28, 1921      2 Sheets-Sheet 2
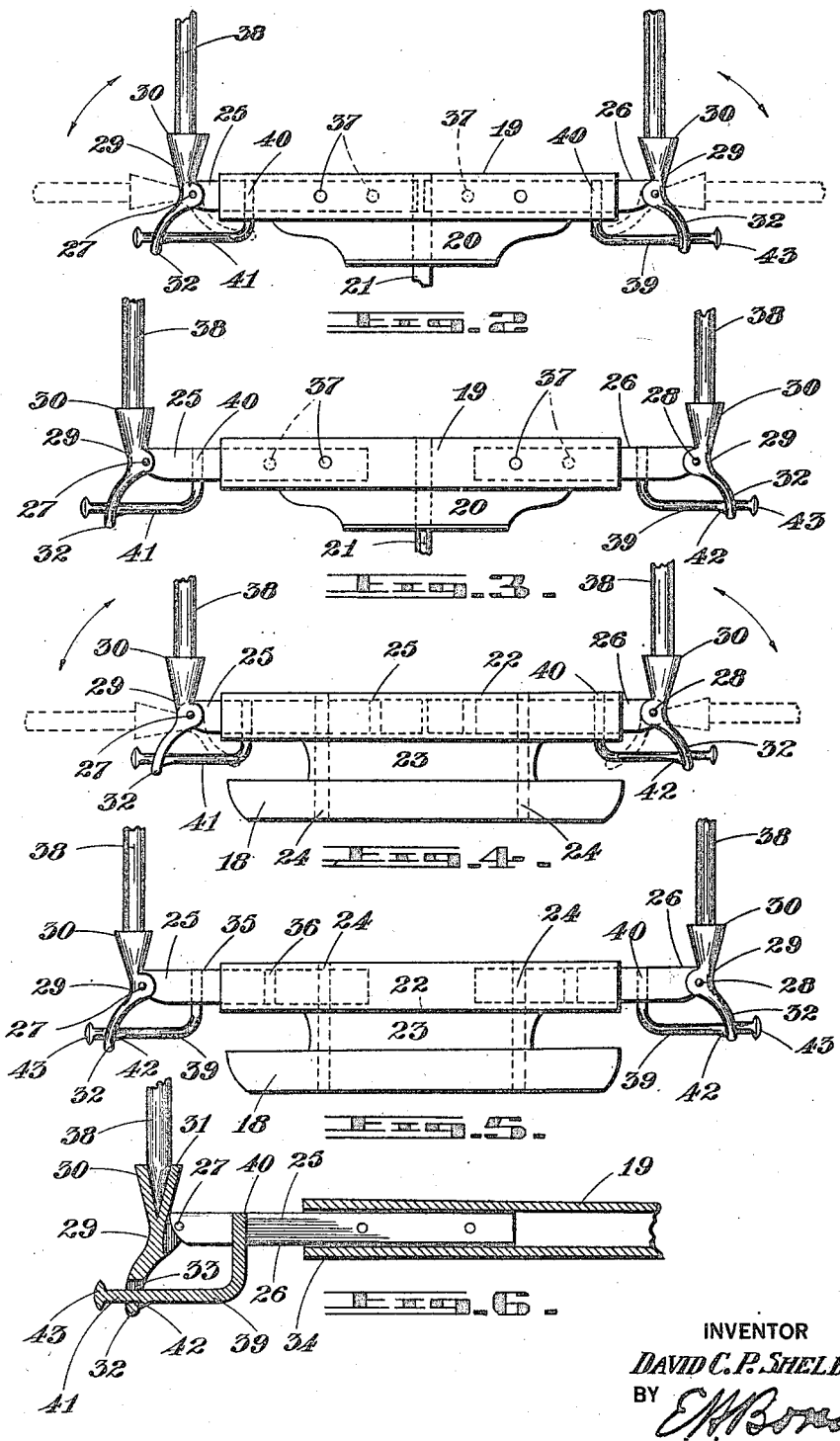
INVENTOR
DAVID C. P. SHELBY.
BY
ATTORNEY Patented Dec. 25, 1923.

1,478,537

UNITED STATES PATENT OFFICE.

DAVID C. P. SHELBY, OF ARNAUD, MANITOBA, CANADA.

EXTENSION SLEIGH BOLSTER.

Application filed December 28, 1921. Serial No. 525,513.

*To all whom it may concern:*

Be it known that I, DAVID C. P. SHELBY, a citizen of the Dominion of Canada, residing at Arnaud, in the county of Provencher and Province of Manitoba, have invented certain new and useful Improvements in Extension Sleigh Bolsters, of which the following is a specification.

The present invention relates to improvements in extension sleigh bolsters, and the principal object is to provide an attachment adapted for connection to sleighs or sledges for locking the body or box thereon.

A further object is to provide attachments of the character described, which may be adjusted to accommodate the sleigh for the hauling of logs and the like, and whereby loads of different width and height may be piled upon the sleigh.

With these and other objects in view, the invention consists in the construction, combination and arrangement of parts as will be hereinafter fully described, illustrated in the accompanying drawings, and pointed out in the claims hereunto appended.

Figure 1 is a perspective view of the forward runner section of a sledge, illustrating the application of the improved bolster thereto.

Fig. 2 is an elevational view of the bolster detached from the runner section and illustrating the adjustment of the several parts, when the box is locked thereon.

Fig. 3 is a similar view, illustrating a further adjustment, when the sledge is used to haul logs or poles.

Fig. 4 is an elevational view of the bolster adapted for attachment to the rear runner section, illustrating the adjustment of the bolster elements, when the box is attached.

Fig. 5 is a similar view of the bolster attachments in expanded position, and

Fig. 6 is a fragmental detail section of the bolster and operative elements.

Referring to the drawings, like numerals designate like parts in the various drawings.

The sleighs and sledges of ordinary construction, either have bodies or boxes which are permanently or detachably connected thereto by means of bolts or the like. In the latter case, more or less trouble is encountered in adjusting the bolts, so I have provided attachments adapted to quickly secure the box to the sledge proper. I have provided bolsters having elements adapted for extension to insure the piling of a relatively large number of logs upon the sleigh.

The numerals 5 and 6 designate the runners of the forward section of the sledge, which latter are connected together forwardly by a draft rod 7 and centrally by a reach bar 8. The ends of the reach bar 8 are inserted within the yoke rods 9 and 10, which latter are connected to the strap members 11 and 12. These strap members are constructed of some suitable spring metal, and have their opposite ends curved upwardly at 13 and 14 and inserted through the cleats 15 and 16 secured by pins 17 to the runners 5 and 6.

Likewise, the rear reach bar 18 is secured to the rear runner section as illustrated in Figs. 4 and 5.

The forward bolster 19 has suitably connected thereto a swivel tree bar 20 which rests upon the reach bar 8 and a bolt 21 passes through openings in said bolster 19 and reach bar 8, by means of which the forward runner section is pivoted to the said reach bar 8.

The rear bolster 22 is likewise secured to a connecting bar 23 and bolts 24 pass through openings in the bolster 22, bar 23 and reach bar 18.

Bolsters 19 and 22 are preferably hollow iron castings.

Adjustably mounted in the ends of the hollow bolsters 19 and 23, are the wooden bars 25 and 26 and connected to the outer ends of said bars 25 and 26 by pins 27 and 28, are the cast iron keeper members 29. These keeper members 29 have conical-shaped upper ends 30, formed with conical openings 31, and the lower ends of said keeper members are bowed outwardly as at 32 and apertured as at 33.

The lower surfaces of the bolsters 19 and 22, at the opposite ends are slotted as at 34, as illustrated clearly in Fig. 6 and likewise the bars 25 and 26 are formed with vertical openings 35 and 36.

The bars 25 and 26 as heretofore stated, are adjustably mounted in the hollow bolsters 19 and 22, and for holding the same in adjusted position, I employ pins 37. This adjustment is made when the box is removed and the load is to comprise a relatively wide pile of logs, and in this instance, poles 38, having sharpened ends, are wedged into the conical openings 31 of the keeper members 29. These poles 38 extend upwardly in vertical plane, at both sides of the sledge, and the logs are assembled therebetween.

For holding the keeper members 29 in upright position, I provide the pin bolts 39 which have their inner ends 40 bent at right angles and inserted into the opening 35 of the bars 25 and 26. The horizontal portions 41 of said pin bolts 39 are formed with spur lugs 42, and flattened end portions 43. The pin bolts 39 extend through the openings 33 of the keeper members 29, and when the latter are in upright position, the lower parts 32 will engage the spur lugs 42.

As the pin bolts 39 are constructed of resilient metal, the same may be elevated at their outer ends to allow for the horizontal adjustment of the keeper members 29 as illustrated in dotted position in the several views.

When adjusted to horizontal position, shorter poles may be inserted into the keeper members and resultantly a wide load may be piled upon the sledge.

The wagon box, when placed upon the runner sections, is wedged between the conical ends 30 of the keeper members 29 and thus the usual bolts are dispensed with.

Likewise, the bars 25 and 26 may be horizontally adjusted to increase the carrying capacity of the sledge.

It is obvious that these improved bolsters may be attached to the running gear of wagons and trucks.

From the foregoing, it is thought that the construction of my invention will be clearly understood, and, therefore, a more extended explanation has been omitted.

Having thus described the invention, what I claim as new, is:

1. A bolster having hollow end portions, and bars movably mounted therein for endwise adjustment, means for holding said bars in adjusted position, keepers pivotally mounted on said bars, and means cooperating with said bars, and keepers for holding the latter in upright position, said means passing through openings in the keepers and having lugs cooperating with said keepers.

2. A bolster having hollow end portions, and bars movably mounted therein for endwise adjustment, means for holding said bars in adjusted position, keepers pivotally mounted on said bars, said keepers having conical ends for wedgingly holding a wagon box between them.

In testimony whereof I hereunto affix my signature in the presence of two witnesses.

DAVID C. P. SHELBY.

Witnesses:
F. C. KEMPSON,
E. LYSTER.